United States Patent [19]

Bunting

[11] 3,758,585

[45] Sept. 11, 1973

[54] COMPLEXES OF INORGANIC SODIUM COMPOUNDS AND CHELATING AMINES

[75] Inventor: William M. Bunting, Baton Rouge, La.

[73] Assignees: Arthur W. Langer, Jr., Watchung; Esso Research and Engineering Company, Linden, both of N.J.

[22] Filed: July 27, 1970

[21] Appl. No.: 58,660

[52] U.S. Cl....... 260/583 P, 260/239 A, 260/239 E, 260/244, 260/248 CS, 260/293 R, 260/293, 260/326.8, 260/429, 260/429.3, 260/429.5, 260/429.7, 260/429.9, 260/430, 260/431, 260/435, 260/438.1, 260/438.5, 260/439, 260/440, 260/446, 260/447, 260/448, 260/563 R, 260/581 C

[51] Int. Cl... C07c 87/20, C07c 87/34, C07c 87/54

[58] Field of Search.................... 260/583 R, 583 P, 260/563 R

[56] References Cited

UNITED STATES PATENTS 3,258,490   6/1966   Bedell............................. 260/583 P
3,541,149   11/1970   Langer........................... 260/563 R

*Primary Examiner*—Lewis Gotts
*Assistant Examiner*—Richard L. Raymond
*Attorney*—Chasan and Sinnock and Harold Einhorn

[57] ABSTRACT

Chelated inorganic sodium compounds are prepared by mixing an inorganic sodium salt having a lattice energy of not more than about 180 kcal/mole with an aliphatic or cycloaliphatic chelating agent having at least one functionality which is nitrogen and, separated therefrom by two to four carbon atoms, at least one other functionality which is either nitrogen or oxygen. Such compounds have utility as catalysts, as additives, in separations, in making batteries, and in synthetic chemistry.

6 Claims, No Drawings

COMPLEXES OF INORGANIC SODIUM COMPOUNDS AND CHELATING AMINES

THE PRIOR ART

It is known that it is possible to obtain stable catalytic complexes comprising organolithiums complexed with bifunctional Lewis bases, particularly with nonaromatic tertiary diamines (U.S. Pat. No. 3,451,988) for use mainly in polymerization and telomerization reactions. It is also known that the use of organosodium and organolithium in the place of the organolithium component in the above catalytic complex will reduce the chain length resulting from telomerization reactions (U.S. Pat. No. 3,206,519). Further, recent publications (Dutch Pat. application Nos. 6804412 and 6804487) have attempted to show that complexes of the above type may be prepared from organosodium complexed with a tertiary aliphatic diamine. These latter complexes are so unstable as to be unisolatable.

It is also known that polyethers have the ability to solvate sodium cations. In a number of cases stable polyether chelates of sodium salts containing a transition metal complex anion have been isolated (U.S. Pat. No. 3,214,452). There is, however, no mention in the literature of the possibility of obtaining stable compounds by reaction of inorganic sodium salts with aliphatic chelating agents having nitrogen as a functional group.

THE PRESENT INVENTION

It has now been unexpectedly discovered that stable chelated inorganic sodium compounds can be prepared by complexing an inorganic sodium salt with aliphatic or cycloaliphatic chelating polyamines and aminoethers. It is well known that one of the significant factors used in predicting whether a reaction can be accomplished with a given material is whether the lattice energy of such material is low enough to be overcome by other reactants so as to form a new compound. Thus, it was highly surprising to find that the inorganic sodium salts, which have significantly higher lattice energies than organosodiums such as those of the prior art, can nevertheless form stable complexes.

It should be understood that for the purposes of this invention, the term "inorganic sodium" means that there is no hydrocarbon radical bonded directly to the sodium atom and any hydrocarbon radical present in the anion moiety must be indirectly bonded to the sodium through a third atom other than carbon. Thus, sodium compounds such as n-butylsodium and phenylsodium do not meet the criteria and are outside the scope of this invention. On the other hand, compounds of the type $NaNH_2$, $NaCN$, $NaSCN$, $NaSH$, $Na_2CO_3$, $NaHCO_3$, $NaAlR_2Cl_2$, $NaAlH(OR)_3$, $NaOH$, $NaOR$, $NaNHR$, $NaBH_4$, $NaNR_2$, $NaSR$, $NaPR_2$ and $NaOOCR$ are inorganic sodium compounds within the scope of this invention.

Useful inorganic sodium salts include, but are not limited to, those in which the anion is a complex metal anion which may be represented by the formula $R'_nMX_m$ wherein $n$ is an integer of 0 to 6, inclusive, depending on the valence of M, $m$ is an integer and $(n + m - 1)$ equals the valence of M, X is a halogen or pseudo-halogen, R' is a $C_1$–$C_{20}$ alkyl, aryl or aralkyl radical and M is a metal selected from the group consisting of beryllium, magnesium, Group I-B elements (i.e., Cu, Ag, Au), Group II-B elements (i.e., Zn, Cd, Hg), Group III elements (i.e., B, Al, Ga), Group IV-A elements other than carbon and silicon, Group V-A elements other than nitrogen (i.e., P, As, Sb, Bi), and the transition metals (i.e., Subgroup B of Groups IV through VIII (i.e., Fe, Co, Ni, Ti, Zr, V, Cr, Nn). The Periodic Table employed in describing this invention is that which appears on the back cover of "Handbook of Chemistry and Physics," (Chemical Rubber Co., 49th Ed.).

Nonlimiting examples of useful anions include the hydridoaluminates, the hydridoborates, the chloroaluminates (tetra-, hepta-, etc.), the aluminum and boron alkyl halides, the aluminum and boron tetraalkyls and -aryls, $AuBr_4^-$, $BF_4^-$, $PF_6^-$, $FeCl_4^-$, $Cr(CO)_5I^-$, $W(CO)_5Br^-$, $MnCl_3^-$, $VF_6^-$, $HgCl_3^-$, $B_2H_7^-$, $UF_4^-$, $AsF_6^-$, $ClO_4^-$, $SCN^-$, $I^-$, $Br^-$, $N_3^-$, $NO_3^-$, O-t-Bu$^-$, $NMe_2^-$, $S\phi^-$.

Preferably, the inorganic sodium salt is one of the following: $NaBr$, $NaI$, $NaN_3$, $NaBH_4$, $NaB_2H_7$, $NaAlH_4$, $NaNO_3$, $NaClO_4$, $NaBF_4$, $NaSCN$, $NaNMe_2$, NaO-t-Bu, $NaS\phi$, $NaAlEt_4$, $NaBBu_4$, $NaBHEt_3$, $NaAlH_2Et_2$, $NaAlH_3O\phi$, $NaPF_6$, $NaFeCl_4$, $NaCr(CO)_5I$.

The chelating agent of the present invention must be aliphatic or cycloaliphatic and contain at least two functional groups, said functional groups being spatially related to one another in such manner as to allow formation of a stable chelate with the sodium atom of the inorganic sodium salt. The functional groups may be either of two types. The first type is selected from the group consisting of a secondary amine group and a tertiary amine group; the second type is selected from the group consisting of a secondary amine group, a tertiary amine group, and an ether group. In other words, the chelating agent must be an aliphatic or cycloaliphatic chelating polyamine or aminoether.

The chelating agent may be sparteine, an N,N'-di-($C_1$–$C_4$ alkyl) bispidin, tris-2(dimethylaminoethyl)-amine as well as those compounds falling within the scope of the following general formulas:

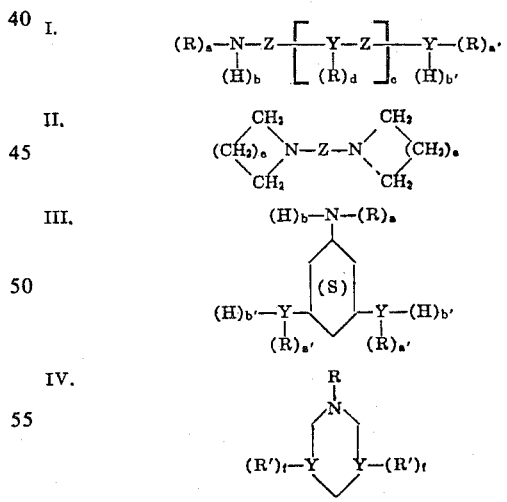

wherein $a$ is 1 or 2, $b$ is 0 or 1, and $a + b = 2$; $c$ is an integer of 0 to 10,000, inclusive; $d$ is 0 or 1, depending on the valance of Y; $e$ is an integer from 0 to 3, inclusive; $f$ is 0 or 1, $a'$ is 1 or 2, $b' = 0$ or 1 and $a' + b' = 1$ or 2, depending on the valence of Y; R is the same or different $C_1$–$C_4$ alkyl radical; R' is hydrogen or is the same or different $C_1$–$C_4$ alkyl radical or $C_6$–$C_{10}$ aryl or aralkyl radical; Y is a nitrogen or oxygen atom; and Z is a nonreactive radical selected from the group consisting of (1) $C_4$-$C_{10}$ cycloaliphatic radicals wherein said radicals are attached to the nitrogen and Y atoms in Formula I and the nitrogen atoms in Formula II at 1,2- or 1,3-positions on the cycloaliphatic rings; and (2) one to four methylenic radicals wherein each methylenic radical contains zero to two monovalent hydrocarbon radicals of one to six carbon atoms.

Suitable nonlimiting examples of chelating agents falling within the scope of the above formulas are:
Cis-N,N,N', N'-tetramethyl 1,2-cyclopentanediamine; N,N,N',N'-tetramethyl-1,2-cyclohexanediamine (cis-, trans-, or mixtures) (TMCHD); N,N,N',N'-tetramethyl-1,2-ethanediamine (TMED); N,N,N',N'-tetramethyl-1,3-propanediamine (TMPD); N,N,N',N'',N''-pentamethyl-diethylenetriamine (PMDT); N,N,N', N'-tetramethyl-1,2-propanediamine (TM1,2PD); N,N'-dimethyl-N,N'-diethyl-1,2-ethanediamine; N,N,N',N'-tetramethyl-1-cyclohexyl-1,2-ethanediamine; N,N,N',N'-tetramethyl-2,3-butanediamine; N,N,N',N'-tetramethyl-1,4-butanediamine; N,N,N''',N''',N'''-hexamethyltriethylene-tetramine (HMTT); tris-($\beta$-dimethylaminoethyl)amine(iso-HMTT); octamethylpentaethylenehexamine (OMPH); heptamethyltetraethylenepentamine (HMTP); N-$\beta$-dimethylaminoethyl),N,N',N'-trimethylcyclohexane-1,2-diamine; methyl di-($\gamma$-dimethylaminopropyl)amine; poly-(N-ethyl-ethyleneimine); poly-(N-methyl ethyleneimine); beta-(dimethylamino)ethyl methyl ether; beta-(diethylamino)ethyl ethyl ether; bis-(beta-dimethylamino)ethyl ether; beta-(dimethylamino)-ethyl ethyl ether; gamma-(dimethylamino)propyl methyl ether; 1,2-dipiperidylethane; tris-(1,3,5-dimethylamino) cyclohexane; N,N',N''-trimethyl-1,3,5-hexahydro-s-triazine; etc.

Preferred chelating agents include sparteine, an N,N'-di-($C_1$-$C_4$)alkyl bispidin, tris-2(dimethylaminoethyl) amine and those compounds falling within the scope of Formula I above. Particularly preferred species of the chelating polyamines are PMDT, HMTT, iso-HMTT, HMTP, OMPH, poly-(N-methyl ethyleneimine), etc. Particularly preferred species of the aminoethers are bis-(beta-dimethylamino)ethyl ether, tris-(beta-methoxyethyl) amine, etc.

Not all inorganic sodium compounds form complexes with the above-described chelating agents. It is, however, possible to relate success in chelating inorganic sodium compounds to the lattice energy of the unchelated sodium compounds and to find an approximate cutoff lattice energy above which chelation does not occur. This cutoff lattice energy has been experimentally determined to be about 180 kcal/mole. Since the ability to form chelates is obviously dependent on the chelating agent employed, this cutoff lattice energy is also chelating agent dependent; i.e., only chelating agents capable of forming the most stable complexes will chelate sodium salts having lattice energies in the area of 180 kcal/mole.

The chelated sodium compounds decompose upon heating to give the unchelated inorganic sodium compound as a precipitate and free chelating agent in solution. Upon cooling, this reaction is reversible. The temperature at which the uncomplexed salt precipitates is quite sharp (1°–2°) and reproducible. Using this information, it was possible to determine the relative thermal stabilities of the chelated sodium compounds. Table I, below, contains decomposition temperatures for a variety of chelated sodium compounds. These temperatures were obtained by synthesizing the chelated sodium compound in benzene, filtering the reaction to give a clear solution, and heating the solution in an oil bath at the rate of about 1°C./min. The temperature at which salt precipitates was taken as the decomposition temperature.

TABLE I

CHELATE DECOMPOSITION TEMPERATURES

| | Temp., °C. |
|---|---|
| $NaBH_4$ | |
| PMDT | 45 |
| HMTT | 45–46 |
| iso-HMTT | 56–58 |
| HMTP | 50–51 |
| NaI | |
| PMDT | 70–72 |
| HMTT | ≁ 80 |
| HMTP | 50–51 |
| OMPH | 60–69 |
| NaOtBu | |
| PMDT | 65 |
| HMTT | > 85 |

From this information it can be seen that the thermal stabilities of the chelated sodium compounds are chelating agent dependent; e.g., chelates of iso-HMTT are more stable than those of HMTT, which are more stable than those of PMDT, which in turn are more stable than those of TMED. This same order can be seen for the cutoff lattice energy which, as already stated, is also chelating agent dependent. Table II, below, lists some inorganic sodium compounds in order of increasing lattice energy and the results of attempts to chelate these compounds with iso-HMTT, HMTT and PMDT.

TABLE II

COMPLEXATION DEPENDS ON LATTICE ENERGY

| | | Complex Formation | | | |
|---|---|---|---|---|---|
| | Lattice | HMTT, PMDT | | Iso-HMTT | |
| Compound | Energy* | Yes | No | Yes | No |
| $NaClO_4$ | 159-175 | x | | | |
| NaSCN | 163-178 | x | | | |
| NaI | 164-166 | x | | | |
| $NaBH_4$ | 168 | x | | x | |
| $NaN_3$ | 169-175 | | x | x | |
| $NaNO_3$ | 173-181 | | x | x | |
| NaBr | 176-178 | | x | x | |
| NaCN | 177-185 | | x | | x |
| NaOAc | 182-198 | | x | | |
| NaCl | 185-186 | | x | | |
| $NaNO_2$ | 185-201 | | x | | |
| NaH | 193-202 | | x | | |
| NaOH | 211 | | x | | |

* Several authors as compiled in M.F.C. Ladd and W. H. Lee in H. Reiss, ed., *Progr. Solid State Chem.*, Vol. I, Pergamon Press, London, 1964.

The complex of the inorganic sodium salt may be readily prepared by mixing the selected inorganic sodium salt (having the requisite maximum lattice energy) with the selected chelating agent in the absence of solvent. Such mixing may also be accomplished in the presence of inert hydrocarbons, e.g., $C_4$-$C_{20}$ alkanes (e.g., pentane, heptane, hexadecane); $C_6$-$C_{20}$ aromatics (e.g., benzene, toluene, xylene, dibutylnaphthalene); halogenated aliphatics and aromatics (e.g., chloroform, methylene dichloride, chlorobenzene, dichlorobenzene, hexafluorobenzene); heterocyclic compounds (e.g., pyridine, pyrrole, furan, thiophene, sulfolane, borazole); polar solvents (e.g., ketones, dimethylsulfoxide, acetonitrile, dimethylformamide, liquid ammonia, triethylamine, propylene carbonate, ethers, etc.); or mixtures thereof.

The amount of the diluent is not critical and amounts in the range of 0 to 99.9 wt. percent, based on the chelated sodium salt may be conveniently employed. Thus, the chelate may be formed in the absence of solvents, in the form of pastes and in solutions.

In those situations where the inorganic sodium salt of choice is not solubilized by the admixture of the chelating agent and solvent, the chelate may be formed by mixing the inorganic sodium salt (which is preferably in finely divided form) with the chelating agent of choice in stoichiometric amounts, or preferably, with excess chelating agent.

Another method for preparing the chelate involves anion exchange. In this method, the chelating agent of choice is mixed with an inorganic sodium salt (in which the anion is not the desired anion) by one of the methods described above. Thereafter, the resultant chelate is subjected to anion exchange in the presence of a metal salt (or other well known techniques such as anion exchange resins) containing the anion of choice; alternatively, all components may be mixed simultaneously and both chelation and metathesis occurs in situ.

Another method for preparing the chelate is analogous to the preceding method except that here the anion is one of choice, but the chelating agent is not one of choice. After preparing the non-preferred chelate by one of the above methods, the non-preferred chelating agent moiety is exchanged for the preferred chelating agent moiety by mixing the chelate (utilizing one of the former methods) with the desired chelating agent and thereafter recovering the desired chelate.

Regardless of the method employed the preparation of the chelate is preferably carried out under anhydrous conditions, although this is not always necessary in some applications, such as separations.

The complex may be readily prepared at temperatures from about −100°C. to about 150°C.; preferably 0° to 100°C.; the latter temperature range is preferred because of convenience and also since higher temperatures favor dissociation of the less stable complexes. Pressures may range from subatmospheric to 100 psig or more. For convenience sake, atmospheric pressures are preferred.

The molar ratio of inorganic sodium compounds to chelating agent is not critical and from about 0.1 to about 50, preferably 0.5 to 10, moles of chelating agent per mole of inorganic sodium are generally employed; the chelating agent may also be employed as a solvent. However, it should be understood that the amount of chelating agent employed may influence the structure of the resultant chelate. In this regard it has been found that true chelate formation occurs only with certain specific ratios; that is, if an incorrect ratio (for true compound formation) were employed, the product would have predominantly the composition of the nearest true compound and it would consist of a mixture of several compounds. Although 1:1 complexes are preferred, it is within the scope of this invention to prepare and isolate complexes of other stoichiometries such as 1:2 and 2:1.

Of course, the minimum amount of chelating agent should be that stoichiometric amount required to produce the desired type of chelate (where more than one type of chelate is possible from a particular inorganic sodium and a particular chelating agent). Where only one type of chelate can be formed or where one is not concerned with the particular type of chelate to be formed (assuming that more than one type is possible), it is desirable to employ amounts of chelating agent in excess of the stoichiometric amount.

One of the uses of the complexes of this invention is the separation and purification of the chelating agents. Advantage may be taken of the fact, shown previously, that stability of the chelate depends upon the temperature of the reaction medium; higher temperatures favor dissociation of the less stable complexes. Temperature, then, may be adjusted to selectively complex the desired chelating agent. In combination with, or as an alternative to, temperature control, the separations may be made by careful selection of an inorganic sodium salt on the basis of its lattice energy. Only the chelating agents capable of forming the most stable chelates will complex an inorganic sodium salt having a lattice energy near the previously stated maximum. Therefore, it is obvious that the more stable chelating agent can be separated from the less stable ones. It is also obvious that chelating agents may be separated, not only from one another but from other compounds or impurities which do not have the ability to chelate the sodium salts of the present invention.

A variation of this separation technique, i.e., using chelating agents to separate inorganic sodium salts from one another and from other salts or impurities including other Group I-A and Group II-A inorganic salts, may also be employed. Thus, for example, a solid mixture of sodium chloride and sodium iodide may be contacted with a chelating agent such as PMDT in benzene and a benzene soluble PMDT-NaI complex will form leaving the sodium chloride behind. The pure sodium iodide may be recovered by heating the solution to 75°C., which destabilizes the complex and precipitates sodium iodide. A similar procedure can be followed to separate a salt such as sodium iodide from another Group I-A or II-A salt or salt mixture such as, for example, potassium iodide.

The pure sodium salt and the chelating agent can each be readily obtained from the complex by destabilization of the complex, e.g., by heating as discussed above, by addition of aqueous or anhydrous acids or bases (e.g., HCl, $H_2SO_4$, NaOH, diglyme, KOH, etc.), etc. Separation of the chelating agent from the sodium salt is done preferably by heating, since both components are recovered pure by this procedure without consuming additional chemicals.

The purification and/or separation processes described above may, of course, be advantageously utilized with column and counterflow techniques, e.g., the inorganic sodium salt (complexed or uncomplexed) may be contacted with a counterflow of a hydrocarbon solution of the chelating agent and the resultant complex may then be subjected to destabilization to recover the desired chelating agent.

Other uses for the novel complexes of the present invention include use as additives, e.g., as oxygen or carbon dioxide scavengers in purification processes; as catalysts, e.g., in metalation and polymerization; in making batteries; as reducing agents, and in synthetic chemistry.

This invention may be illustrated, but is not limited to, the following examples:

EXAMPLE 1

PMDT ○ NaOtBu

To 2.4 g (25 mmoles) of sodium t-butoxide were added 25 ml benzene and 5.5 ml (~25 mmoles) PMDT. The solution was stirred overnight at room temperature and then filtered. The precipitate weighed 0.98 g. The solution was slowly and partially evaporated to give white crystals which were filtered off. Elemental analysis showed that the crystals were sodium t-butoxide. Sodium t-butoxide itself is not soluble in benzene. The solubility of sodium t-butoxide in benzene in this experiment is ascribed to the formation of a benzene soluble complex between sodium t-butoxide and PMDT. The complex is not stable enough to be isolated under the conditions of this experiment. Calc'd. for NaO-t-butyl: C, 50.0; H, 9.4; Na, 24.0. Found: C, 46.98; H, 9.04; N, < 0.1; Na, 24.69.

EXAMPLE 2

PMDT ○ NaAlH$_4$

To 0.68 g (12.5 mmoles) sodium aluminum hydride were added 25 ml benzene and 2.8 ml (~12 mmoles) PMDT. After stirring 2 hours, 2.8 ml more PMDT was added. The solution remained cloudy and was stirred overnight and filtered. The filtrate was allowed to slowly and partially evaporate to give white crystals of PMDT ○ NaAlH$_4$.

EXAMPLE 3

PMDT ○ NaBH$_4$

To 0.48 g (12.5 mmoles) sodium borohydride were added 25 ml benzene and 2.8 ml (~12.5 mmoles) PMDT. Upon stirring, the reaction became a solution containing a small amount of finely divided precipitate. The addition of 2.8 ml more PMDT gave the visual impression that the amount of finely divided precipitate suspended in solution had decreased. After stirring overnight, the reaction was filtered. The filtrate was allowed to slowly and partially evaporate to give white crystals of composition PMDT • NaBH$_4$. Calc'd. for PMDT ○ NaBH$_4$: C, 51.2; H, 12.9; N, 19.0. Found: C, 51.6; H, 13.3; N, 20.1. Despite the twofold excess of PMDT, only the PMDT ○ NaBH$_4$ complex could be isolated, not the (PMDT)$_2$NaBH$_4$ complex.

EXAMPLE 4

To 1.38 g (12.5 mmoles) sodium fluoroborate were added 25 ml benzene and 3.7 ml (~12.5 mmoles) HMTT. The reaction was stirred overnight at room temperature and filtered. The filtrate was allowed to slowly and partially evaporate to give crystals of composition HMTT ○ NaBF$_4$. Calc'd. for HMTT • NaBF$_4$: C, 42.4; H, 8.9; N, 16.5. Found: C, 43.1; H, 9.3; N, 16.4.

EXAMPLE 5

PMDT ○ NaNMe$_2$

To 1.4 g (21 mmoles) of sodium dimethylamide (synthesized from dimethyl amine and benzylsodium) were added 25 ml benzene and 3 g (17 mmole) PMDT. The reaction was stirred 2 hours and filtered. The filtrate was allowed to slowly and partially evaporate to give crystals of composition PMDT ○ NaNMe$_2$. Calc'd. for PMDT ○ NaNMe$_2$: C, 55.0; H, 12.1; N, 23.3. Found: C, 55.3; H, 12.3; N, 23.0.

EXAMPLE 6

HMTT ○ NaI

To 1.5 g (10 mmoles) NaI were added 25 ml benzene and 2.3 g (10 mmoles) HMTT. The reaction was stirred 2 hours to give complete solution. The solution was slowly and partially evaporated to give white crystals of composition HMTT • NaI. Calc'd. for HMTT • NaI: C, 37.9; H, 7.9; N, 14.7; I, 33.4. Found: C, 39.2; H, 8.2; N, 15.0; I, 31.5.

In a similar manner PMDT • NaI was prepared. Calc'd. for PMDT ○ NaI: C, 33.6; H, 7.1; N, 13.0; I, 39.5. Found: C, 33.6; H, 7.2; N, 13.1; I, 40.8.

EXAMPLE 7

PMDT ○ NaSCN

To 0.81 g (10 mmoles) sodium thiocyanate were added 25 ml of benzene and 2.2 ml (~10 mmoles) PMDT. The reaction was stirred overnight and filtered to give solid A. The filtrate was slowly and partially evaporated to give solid B. Both solids had composition PMDT ○ NaSCN. Calc'd. for PMDT • NaSCN: C, 47.2; H, 9.0; N, 22.0. Found for solid A: C, 45.8; H, 8.9; N, 21.3. Found for solid B: C, 48.1; H, 9.6; N, 28.6.

EXAMPLE 8

PMDT ○ NaClO$_4$

To 0.62 g (5 mmoles) NaClO$_4$ were added 25 ml benzene and 1.1 ml PMDT (~5 mmoles). The reaction was stirred overnight and filtered to give solid A. The filtrate was slowly and partially evaporated to give white needles (solid B). Solids A and B had composition PMDT • NaClO$_4$. Calc'd. for PMDT • NaClO$_4$: C, 36.6; H, 7.8; N, 14.2. Found for solid A: C, 30.4; H, 6.8; N, 13.8. Found for solid B: C, 39.0; H, 8.4; N, 14.0.

EXAMPLE 9

Iso-HMTT • NaNO$_3$

To 0.34 g (4 mmoles) NaNO$_3$ in one barrel of a double-barrel Schlenk tube fitted with a fritted filter were added 7 ml benzene and 1 ml (~4 mmoles) iso-HMTT. The barrel containing the reaction mixture was put into a cold water bath maintained at 10°. After stirring 1½ hours a white ppt. remained. The reaction was filtered from one barrel to the other and allowed to stand at room temperature overnight with no visible change. The filtrate was put on a vacuum line and the benzene removed. When about 1 ml of solution remained, the filtrate was heated to about 50° for several minutes. A white ppt. formed which readily redissolved upon addition of one-half ml of benzene, indicating that the precipitate was chelated sodium nitrate. An I.R. of the solution had bands at about 1,360 and 840 cm$^{-1}$, typical of inorganic NO$_3^-$.

EXAMPLE 10

PMDT ○ NaBH$_4$

To 0.38 g (10 mmoles) NaBH$_4$ were added 25 ml heptane and 2.2 ml (~10 mmoles) PMDT. The reaction was stirred 3 hours, and filtered to give solid A. The filtrate was partially evaporated to give white crystals which were filtered off, dried and labeled solid B. Calc'd. for PMDT • NaBH$_4$: C, 51.2; H, 12.9; N, 19.9. Found for solid A: C, 5.06; H, 10.68; N, 2.67. Found for solid B: C, 49.74; H, 13.30; N, 19.68.

This experiment shows that the paraffinic hydrocarbons may also be suitable solvents for preparing chelated sodium compounds.

EXAMPLE 11

Separation of NaI and NaCl

To 0.5 g NaI and 0.5 g NaCl suspended in 25 ml. of benzene was added 2.2 ml PMDT. The reaction was stirred overnight and filtered to give solid A. Solid A was washed with benzene, dried and analyzed. The filtrate was evaporated under vacuum to give solid B which was analyzed. Calc'd. for initial mixture: Cl, 30.5; I, 42.5. Found for solid A: I, 5.63; Cl, 59.38. Found for solid B: I, 42.73; Cl, 0.00. Calc'd. for PMDT •NaI: I, 39.5.

This experiment shows that sodium iodide and sodium chloride can be separated by selective chelation.

EXAMPLE 12

Separation of Sodium Iodide and Potassium Iodide

To 0.5 g sodium iodide and 0.5 g potassium iodide suspended in 25 ml benzene was added 2.2 ml PMDT. The reaction was stirred overnight and filtered to give solid A. Solid A was washed with benzene, dried, and analyzed. The filtrate was evaporated under vacuum to give solid B. Calc'd. for initial mixture: Na, 7.65; K, 11.7. Found for solid A: Na, 0.22; K, 4.73. Found for solid B: Na, 7.01; K, 0.02. This experiment shows that sodium iodide and potassium iodide can be separated by selective chelation.

EXAMPLE 13

Separation of Sodium Perchlorate and Sodium Iodide

To 0.75 g sodium iodide (5 mmoles) and 0.60 g sodium perchlorate (5 mmoles) suspended in 25 ml benzene was added 0.87 g (5 mmoles) PMDT. The reaction was stirred 2 hours and filtered to give solid A (0.88 g). Solid A was washed with benzene, dried, and analyzed. The filtrate was evaporated under vacuum to give solid B. Calc'd. for initial mixture: Cl, 12.9 I, 47.0. %I/%Cl: 3.64. Found for solid A: Cl, 6.52; I, 57.02. %I/%Cl: 8.8. Found for solid B: Cl, 8.73; I, 10.53. %I/%Cl: 1.2.

This experiment shows that two sodium compounds forming relatively stable amine chelates can be partially separated in one stage by the difference in stability of their complexes. Therefore, the use of additional chelating stages should allow complete separation of quite similar sodium salts.

EXAMPLE 14

Separation of Sodium Borohydride and Sodium Iodide

To 0.12 g (3 mmoles) sodium borohydride and 0.45 g sodium iodide (3 mmoles) were added 1.3 ml (6 mmoles) PMDT and 7 ml benzene. The solution was heated to 60° and filtered. Infrared showed a marked decrease in the B-H band in the filtrate compared with the original solution. The filtrate was evaporated to give 1.08 g solid (theoretical yield of PMDT • NaI is 0.97 g).

This experiment is qualitative rather than quantitative, but still shows that sodium borohydride and sodium iodide can be partially separated by taking advantage of the difference in their thermal stabilities.

EXAMPLE 15

OMPH • NaI

To 1.5 g (10 mmoles) of sodium iodide were added 25 ml benzene and 4.3 ml (10 mmoles) OMPH. The reaction was stirred overnight and filtered. The filtrate was slowly and partially evaporated to give crystals of OMPH • NaI. Calc'd. for OMPH • NaI: C, 43.3; H, 8.91; N, 17.0. Found: C, 44.8; H, 8.91; N, 17.93.

EXAMPLE 16

To 2.3 g (10 mmoles) of a mixture of iso-HMTT and HMTT (21.8:78.2) in 15 ml of n-pentane was added 0.325 g (2.2 mmole) of sodium iodide with stirring. A fluffy precipitate formed almost immediately replacing the gramular sodium iodide. The reaction was stirred overnight and filtered. GC analysis showed the composition of the filtrate to be (iso-HMTT:HMTT) 0.4:99.6.

This experiment shows that iso-HMTT can be selectively and simply removed from a mixture of iso-HMTT and HMTT by selective complexation with sodium salts. The alternative method of separation involves a lengthy and careful fractional distillation.

EXAMPLE 17

A mixture of 1.45 g N,N', N''-trimethyldiethylenetriamine (TriMDT) (10 mmoles) and 1.52 g powdered sodium iodide (10 mmoles) in 50 ml benzene was stirred 5 days at 25°–30°C. under nitrogen. After filtering off 1.96 g of white solid, the filtrate was evaporated yielding a white crystalline residue which was washed with heptane, filtered and vacuum dried. The TriMDT •NaI chelate weighed 0.34 g. This example shows that chelating polyamines containing secondary amine functionality may be used to prepare chelates of sodium salts.

While the above examples adequately illustrate the invention, it should be understood that the present invention in its broadest aspects is not necessarily limited to the specific materials, conditions and procedures shown therein. The present invention is limited only by the claims which follow.

What is claimed is:

1. A complex of:
   a. an inorganic sodium salt having a lattice energy of not more than about 180 kcal per mole and
   b. an aliphatic or cycloaliphatic tertiary chelating hydrocarbyl polyamine.

2. A complex of:
   a. an inorganic sodium salt having a lattice energy of not more than about 180 kcal per mole and
   b. an aliphatic or cycloaliphatic chelating agent selected from the group consisting of tris-2(dimethylaminoethyl)-amine and those compounds falling within the scope of the following general formula I. 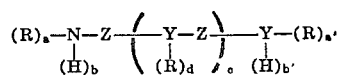

II. 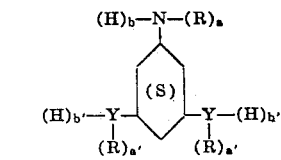

wherein $a$ is 1 or 2, $b$ is 0 or 1, and $a + b = 2$; $c$ is an integer of 0 to 10,000, inclusive; $d$ is 0 or 1, depending on the valence of Y; $a'$ is 1 or 2, $b' = 0$ or 1 and $a' + b' = 1$ or 2, depending on the valence of Y; R is the same or different $C_1$-$C_4$ alkyl radicals; Y is a nitrogen or oxygen atom; and Z is a nonreactive radical selected from the group consisting of (1) $C_4$-$C_{10}$ cycloaliphatic radicals wherein said radicals are attached to the nitrogen and Y atoms in Formula I at 1,2- or 1,3-positions on the cycloaliphatic rings; and (2) one to four methylenic radicals wherein each methylenic radical contains zero to two monovalent hydrocarbon radicals of one to six carbon atoms.

3. The complex of claim 2 wherein the chelating agent is selected from the group consisting of tris-2(dimethylaminoethyl)-amine and compounds having the following formula:

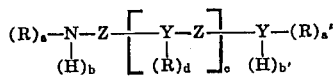

wherein $a$ is 1 or 2, $b$ is 0 or 1, and $a + b = 2$; $c$ is an integer of 0 to 10,000 inclusive; $d$ is 0 or 1 depending on the valence of Y; $a'$ is 1 or 2, $b'$ is 0 or 1 and $a' + b' = 1$ or 2, depending on the valence of Y; R is the same or different $C_1$-$C_4$ alkyl radical; Y is a nitrogen or oxygen atom; and Z is a nonreactive radical selected from the group consisting of (1) $C_4$-$C_{10}$ cycloaliphatic radicals wherein said radicals are attached to the N and Y atoms at 1,2- or 1,3-positions on the cycloaliphatic rings, and (2) one to four methylenic radicals wherein each methylenic radical contains zero to two monovalent hydrocarbon radicals of one to six carbon atoms.

4. The complex of claim 1 wherein the chelating agent is selected from the group consisting of N,N,N',N'',N''-pentamethyldiethylenetriamine, N,N,N',N'',N''',N'''-hexamethyltriethylenetetramine, tris-($\beta$-dimethylaminoethyl)amine, heptamethyltetraethylenepentamine, octamethylpentaethylenehexamine, and poly-(N-methylethyleneimine).

5. A complex according to claim 1 wherein said chelating polyamine is tris-2(dimethylaminoethyl)-amine.

6. A complex according to claim 1 wherein said sodium salt is sodium dimethyl amide and said tertiary chelating hydrocarbyl polyamine is N,N,N',N'',N''-pentamethyl-diethylene-triamine.

* * * * *

UNITED STATES PATENT OFFICE
CERTIFICATE OF CORRECTION

Patent No. 3,758,585    Dated September 11, 1973

Inventor(s) William M. Bunting and Arthur W. Langer, Jr.

It is certified that error appears in the above-identified patent and said Letters Patent are hereby corrected as shown below:

Cover page, under "United States Patent [19]", "Bunting" should read -- Bunting et al --.
"[75] Inventor: William M. Bunting, Baton Rouge, La." should read -- [75] Inventors: William M. Bunting, Baton Rouge, La.; Arthur W. Langer, Jr., Watchung; both of N.J. --
[73] Assignees: Delete "Arthur W. Langer, Jr., Watchung;", and change "both of N.J." to read -- N.J. --.

Signed and sealed this 1st day of January 1974.

(SEAL)
Attest:

EDWARD M. FLETCHER, JR.
Attesting Officer

RENE D. TEGTMEYER
Acting Commissioner of Patents